(12) United States Patent
Iwayama (10) Patent No.: US 8,500,021 B2
(45) Date of Patent: Aug. 6, 2013

(54) IMAGE READING APPARATUS (75) Inventor: Akira Iwayama, Ishikawa (JP)

(73) Assignee: PFU Limited, Ishikawa (JP)

( * ) Notice: Subject to any disclaimer, the term of this patent is extended or adjusted under 35 U.S.C. 154(b) by 99 days.

(21) Appl. No.: 13/225,448

(22) Filed: Sep. 4, 2011

(65) Prior Publication Data
US 2012/0048934 A1 Mar. 1, 2012

Related U.S. Application Data (62) Division of application No. 12/254,344, filed on Oct. 20, 2008, now abandoned.

(30) Foreign Application Priority Data

Apr. 22, 2008 (JP) .................................. 2008-111765

(51) Int. Cl.
G06K 7/10 (2006.01)
(52) U.S. Cl.
USPC ........... 235/454; 235/380; 235/439; 235/440; 235/462.14; 235/462.45; 235/462.41; 235/491
(58) Field of Classification Search
USPC ............... 235/380, 439, 440, 462.14, 462.41, 235/462.45, 454, 491, 375, 474, 479, 451; 358/498, 474, 1.14, 1.15; 340/572.1
See application file for complete search history.

(56) References Cited

U.S. PATENT DOCUMENTS

| | | | |
|---|---|---|---|
| 4,793,812 A | 12/1988 | Sussman et al. | |
| 5,059,951 A | 10/1991 | Kaltner | |
| 6,114,621 A | 9/2000 | Tachino et al. | |
| 6,195,053 B1 | 2/2001 | Kodukula et al. | |
| 7,239,243 B2 * | 7/2007 | Chiu | 340/572.1 |
| 7,538,904 B2 | 5/2009 | Ikeda et al. | |
| 2006/0289645 A1 * | 12/2006 | Schuessler | 235/451 |
| 2007/0187266 A1 | 8/2007 | Porter et al. | |

FOREIGN PATENT DOCUMENTS

| | | |
|---|---|---|
| JP | 2004318834 A | 11/2004 |
| JP | 2005182170 | 7/2005 |
| JP | 2007188279 A | 7/2007 |

OTHER PUBLICATIONS

Official Action in Japanese patent application No. 2008111765 dated Dec. 6, 2011.

* cited by examiner

*Primary Examiner* — Daniel Hess
*Assistant Examiner* — Michael Andler
(74) *Attorney, Agent, or Firm* — Lowe Hauptman Ham & Berner, LLP (57) ABSTRACT

In an image reading apparatus, an interference suppressing unit includes a closed-loop coil that forms a suppression area disposed in a propagation area where at least either one of the electromagnetic wave for power supply and the electromagnetic wave for transmission and reception of the ID information is propagated, and suppresses a magnetic-flux change based on the magnetic-flux change in the propagation area. At least one of an image pickup device and a carrier cable is disposed in the suppression area, and consequently, interference of the electromagnetic wave for power supply or the electromagnetic wave for transmission end reception of ID information that would otherwise propagate to a reading unit with the carrier cable thereof is suppressed. Thus, even if pickup image data of the RFID card and the ID information of the electronic tag are simultaneously obtained, the obtained pickup image data can be of high quality.

2 Claims, 3 Drawing Sheets

IMAGE READING APPARATUS

CROSS REFERENCE TO RELATED APPLICATIONS

This application is a divisional of U.S. application Ser. No. 12/254,344, filed Oct. 20, 2008, which claims priority to Japanese Patent Application No. 2008-111765, filed Apr. 22, 2008, the entire contents of which is incorporated herein by reference.

BACKGROUND OF THE INVENTION

1. Field of the Invention

The present invention relates to an image reading apparatus that images a Radio Frequency Identification (RFID) card.

2. Description of the Related Art

In recent years, RFID cards with Identification (ID) information stored therein have become prevalent for use, such as a driver's license.

On a surface of an RFID card, information about the owner of this RFID card and other information are recorded, for example.

Meanwhile, the RFID card has incorporated therein a tag with ID information stored therein. When an electromagnetic wave for power supply is applied to the RFID card from a transmitting and receiving unit provided to a tag reader or the like, for example, an ID-information transmitting unit provided to the RFID card transmits the ID information of the tag with an electromagnetic wave for transmission and reception of the ID information. The electromagnetic wave for transmission and reception of the ID information transmitted from the RFID card is received by the transmitting and receiving unit provided to the tag reader or the like, for example. Further, the ID information of the tag is obtained by an ID-information obtaining unit provided to the tag reader or the like, for example.

Conventionally, technologies have been suggested for obtaining, from an RFID card placed on a card mounting surface of an image reading apparatus, both pickup image data representing an image read surface of the RFID card on a card mounting surface side and ID information stored in a tag of the RFID card. One example of such technologies is disclosed in Japanese Patent Application Laid-open Publication No. 2005-182170. In an image reading apparatus disclosed in the above patent application, when the image read surface of the RFID card placed on the card mounting surface is imaged by a reading unit, a pickup image signal is output from that reading unit, and pickup image data based on this pickup image signal is generated by an image-data generating unit. Also in this image reading apparatus, in addition to generation of pickup image data, ID information of the tag of the RFID card is obtained in a manner similar to that explained above by using the electromagnetic wave for power supply and the electromagnetic wave for transmission and reception of the ID information. As such, in the image reading apparatus disclosed in the above patent application mentioned above, the pickup image data representing the image read surface of the RFID card and the ID information of the tag can both be obtained by a single apparatus.

In more detail, in the image reading apparatus disclosed in the above patent application mentioned above, when the image read surface of the RFID card is imaged by the reading unit, to prevent an influence of the electromagnetic wave for power supply, the electromagnetic wave for transmission and reception of the ID information, or both for reading the ID information of the tag over the pickup image signal output from the reading unit, a transmission coil, which configures a transmitting and receiving unit that transmits the electromagnetic wave for power supply to the RFID card, is set to an inactive state. As a result, while the reading unit is imaging the image read surface of the RFID card, the electromagnetic wave for power supply and the electromagnetic wave for transmission and reception of the ID information are not transmitted and received between the ID-information transmitting unit of the RFID card and the transmitting and receiving unit of the image reading apparatus. Therefore, the electromagnetic wave for power supply and the electromagnetic wave for transmission and reception of the ID information do not have an influence over the pickup image signal representing the image read surface of the RFID card, thereby achieving a high-quality pickup image of the image read surface of the RFID card without an influence of the electromagnetic wave for power supply and the electromagnetic wave for transmission and reception of the ID information over the pickup image data representing the image read surface of the RFID card.

Here, in obtaining both of the pickup image data representing the image read surface of the RFID card and the ID information of the tag, there is a need for imaging the image read surface of the RFID card and obtaining the ID information of the tag simultaneously, thereby reducing time required for obtaining both of the pickup image data representing the image read surface of the RFID card and the ID information of the tag.

However, if imaging of the image read surface of the RFID card and obtainment of the ID information of the tag are performed simultaneously, at least either one of the electromagnetic wave for power supply and the electromagnetic wave for transmission and reception of the ID information will have an influence over the pickup image signal representing the image read surface of the RFID card. For this reason, if imaging of the image read surface of the RFID card and obtainment of the ID information of the tag are performed simultaneously, at least either one of the electromagnetic wave for power supply and the electromagnetic wave for transmission and reception of the ID information will also have an influence over the pickup image data representing the image read surface of the RFID card, thereby degrading the quality of the pickup image of the image read surface of the RFID card.

SUMMARY OF THE INVENTION

It is an object of the present invention to at least partially solve the problems in the conventional technology.

According to an aspect of the present invention, an image reading apparatus includes a light source that emits light toward a card mounting surface where an RFID card is placed, the RFID card having incorporated therein a tag having ID information stored therein and an ID-information transmitting unit that receives an electromagnetic wave for power supply and transmits the ID information with an electromagnetic wave for transmission and reception of the ID information; a reading unit that includes an image pickup device, a casing that houses the image pickup device, and a light guide that guides light reflected by the RFID card to the image pickup device, and that images, based on the light from the light source, an image read surface of the RFID card on a card mounting surface side when the RFID card is placed on the card mounting surface and outputs a pickup image signal representing the image read surface of the RFID card; an image-data generating unit that generates pickup image data of the image read surface of the RFID card based on the output pickup image signal; a transmitting and receiving unit that transmits the electromagnetic wave for power supply and receives the electromagnetic wave for transmission and reception of the ID information; an ID-Information obtaining unit that obtains the ID information based on the received electromagnetic wave for transmission and reception of the ID information, when the RFID card is imaged by the reading unit; and an interference suppressing unit that suppresses interference of at least either one of the electromagnetic wave for power supply and the electromagnetic wave for transmission and reception of the ID information with the reading unit Further, the image pickup device images the image read surface of the RFID card based on the light from the light source and outputs the pickup image signal representing the image read surface of the RFID card, the reading unit includes a carrier cable that transmits the pickup image signal to the image-data generating unit, the interference suppressing unit suppresses the interference of at least either one of the electromagnetic wave for power supply and the electromagnetic wave for transmission and reception of the ID information with at least either one of the image pickup device and the carrier cable, and includes a closed-loop coil that forms a suppression area disposed in a propagation area where at least either one of the electromagnetic wave for power supply and the electromagnetic wave for transmission and reception of the ID information is propagated and a magnetic-flux change is suppressed based on the magnetic-flux change in the propagation area, and at least either one of the image pickup device and the carrier cable is disposed in the suppression area.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the image reading apparatus according to the present invention are explained in detail below based on the drawings. Note that the following embodiments are not meant to restrict the present invention.

Figure 1:
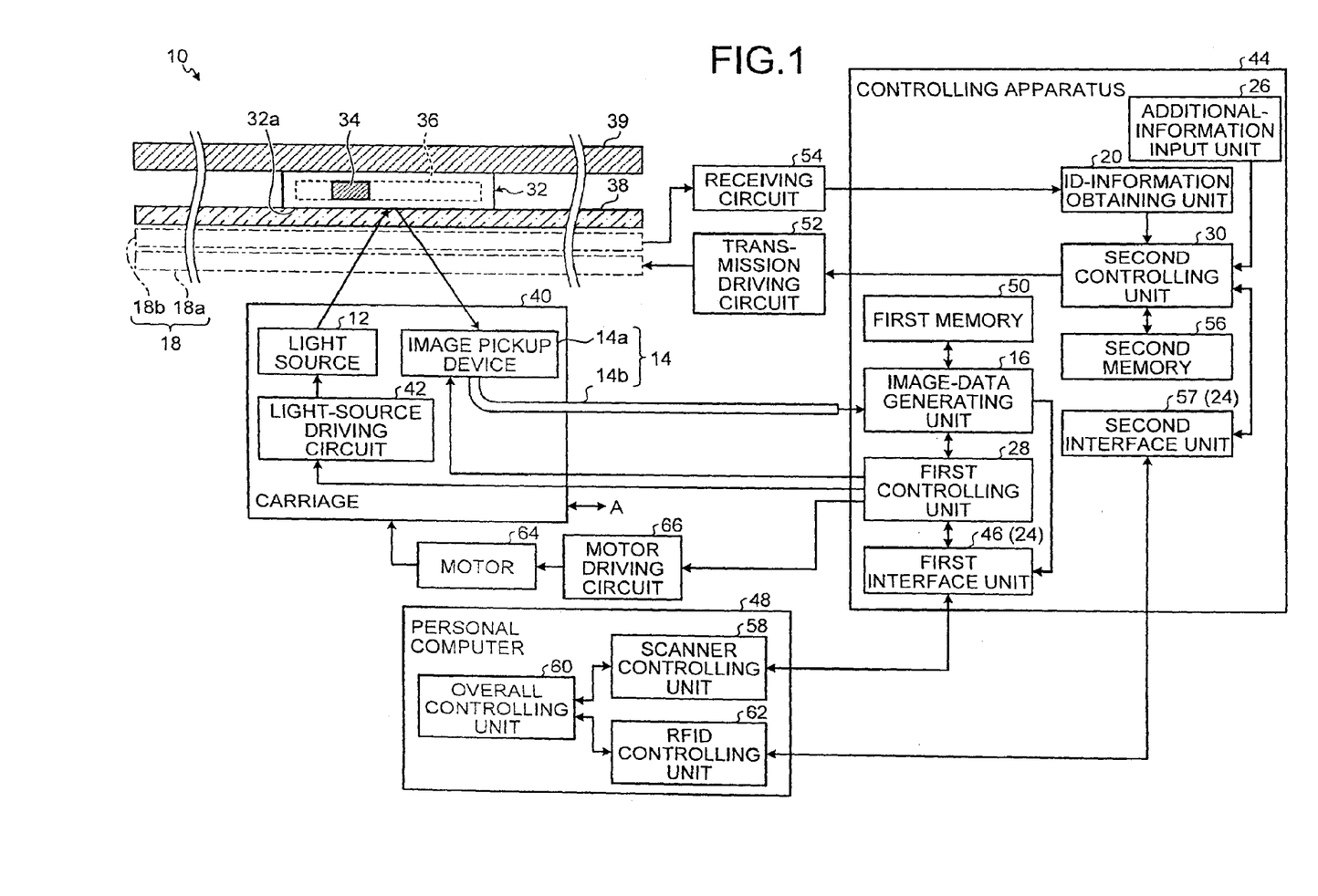
FIG. 1 is a block diagram schematically depicting an image reading apparatus according to a first embodiment of the present invention.
Figure 2:
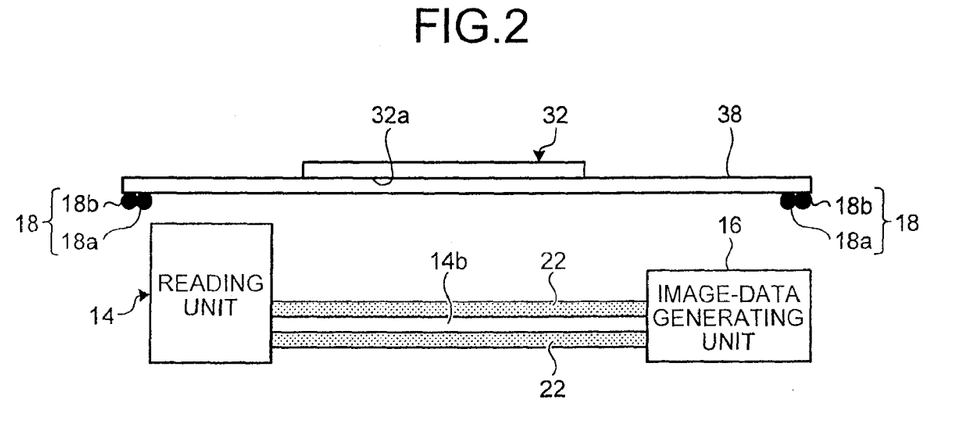
FIG. 2 is a schematic drawing of a main portion of the image reading apparatus.

An image reading apparatus according to a first embodiment of the present invention is explained below. FIG. 1 is a block diagram schematically depicting the image reading apparatus according to the first embodiment. FIG. 2 is a schematic drawing of a main portion of the image reading apparatus.

An image reading apparatus 10 includes a light source 12, a reading unit 14, an image-data generating unit 16, a transmission and reception antenna unit 18 as a transmitting and receiving unit, an ID-information obtaining unit 20, a magnetic shielding member 22 as an interference suppressing unit, an additional-information input unit 26, interfaces 24, and first and second controlling units 28 and 30 as an encrypting unit. In the first embodiment, it is assumed for explanation that the image reading apparatus 10 is an image reading apparatus of a flatbed type.

Here, an RFID card 32 has incorporated therein an electronic tag 34 as a tag and an antenna coil 36 as an ID-information transmitting unit. The electronic tag 34 is a so-called IC (integrated circuit) chip. In this electronic tag 34, for example, information about the owner of this RFID card 32, that is, ID information, is stored in advance. Also, the antenna coil 36 is connected to the electronic tag 34. This antenna coil 36 receives an electromagnetic wave for power supply transmitted from the transmission and reception antenna unit 18 and transmits the ID information of the electronic tag 34 with an electromagnetic wave for transmission and reception of the ID information to the transmission and reception antenna unit 18. Here, the RFID card 32 is placed on a transparent, colorless card mounting surface 38 provided to a housing of the image reading apparatus 10. Note that a member denoted by a reference numeral 39 in FIG. 1 is a lid member that covers the card mounting surface 38. This lid member 39 is formed in a rectangular shape, for example. The card mounting surface 38 side of the lid member 39 is white, and has a function of serving as a white reference plate.

The light source 12 emits light toward the card mounting surface 38. That is, when the RFID card 32 is placed on the card mounting surface 38, light is emitted toward an image read surface 32a of the RFID card 32 on the card mounting surface 38. The light source 12 is incorporated in a carriage 40. When the RFID card 32 is placed on the card mounting surface 38, the light source 12 faces the RFID card 32 across the card mounting surface 38. The light source 12 is formed in a line shape in a width direction of the card mounting surface 38 (a direction parallel to the card mounting surface 38 and orthogonal to a direction indicated by an arrow A depicted in FIG. 1). With the movement of the carriage 40, the light source 12 emits light to the entire area of the card mounting surface 38. Therefore, when the RFID card 32 is placed on the card mounting surface 38, light is emitted to the image read surface 32a of the RFID card 32. The light source 12 is driven by a light-source driving circuit 42. The light-source driving circuit 42 is connected to the first controlling unit 28 incorporated in a controlling apparatus 44. The light-source driving circuit 42 is controlled by the first controlling unit 28. Therefore, light emission from the light source 12 is controlled by the first controlling unit 28.

The reading unit 14 images the image read surface 32a of the RFID card 32 on the card mounting surface 38. When the RFID card 32 is placed on the card mounting surface 38, the reading unit 14 images the image read surface 32a of the RFID card 32 on the card mounting surface 38 side based on the light from the light source 12, and outputs an pickup image signal representing the image read surface 32 of the RFID card 32. This reading unit 14 includes an image pickup device 14a and a carrier cable 14b.

The image pickup device 14a scans the entire area of the card mounting surface 38. The image pickup device 14a is incorporated in the carriage 40. When the RFID card 32 is placed on the card mounting surface 38, the image pickup device 14a faces the RFID card 32 across the card mounting surface 38. The image pickup device 14a includes a Charge Coupled Device (CCD) image pickup device, for example. Alternatively, the image pickup device 14a may include a complementary metal oxide semiconductor (CMOS) image pickup device. This image pickup device 14a is arranged in a line shape in a width direction of the card mounting surface 38, for example. With the movement of the carriage 40, the image pickup device 14a scans the entire area of the card mounting surface 38. Therefore, when the RFID card 32 is placed on the card mounting surface 38, light from the light source 12 reflected from the image read surface 32 of the RFID card 32, that is, reflected light, is incident to the image pickup device 14a. Therefore, from the image pickup device 14a, a pickup image signal for each exposure corresponding to the entire area of the card mounting surface 38 including information about the image read surface 32a is output. As such, the image pickup device 14a images the image read surface 32a of the RFID card 32 based on the light from the light source 12, and outputs a pickup image signal representing the image read surface 32a of the RFID card 32. The image pickup device 14a is connected to the first controlling unit 28. For the image pickup device 14a, the first controlling unit 28 controls an exposure interval, for example.

The carrier cable 14b transmits the pickup image signal output from the image pickup device 14a to the image-data generating unit 16. The carrier cable 14b is formed of an electrical wire, such as a copper wire, for example.

The image-data generating unit 16 generates pickup image data representing the image read surface 32a of the RFID card 32 based on the pickup image signal output from the image pickup device 14a. In the first embodiment, the image-data generating unit 16 generates entire pickup image data based on scanning over the entire area of the card mounting surface 38 by the image pickup device 14a. The image-data generating unit 16 generates pickup image data for each exposure corresponding to the information about the entire area of the card mounting surface 38 including the information about the image read surface 32a of the RFID card 32. Based on the generated pickup image data for each exposure, the image-data generating unit 16 generates entire pickup image data. With the position of the RFID card 32 with respect to the card mounting surface 38 is specified by a position specifying unit not shown, the image-data generating unit 16 may generate pickup image data corresponding to the image read surface 32a of the RFID card 32 from the entire pickup image data. That is, the image-data generating unit 16 may crop the entire pickup image data to generate pickup image data. By outputting the generated entire pickup image data to a personal computer 48 connected via a first interface unit 46 to the image reading apparatus 10, this cropping may be performed by the personal computer 48. The image data generated by the image-data generating unit 16 is temporarily stored in a first memory 50. That is, this first memory 50 serves as a buffer. The first memory 50 is a non-volatile memory, such as a flash memory, for example.

The transmission and reception antenna unit 18 obtains the ID information from the electronic tag 34 of the RFID card 32 by using an electromagnetic wave. In the first embodiment, the transmission and reception antenna unit 18 is provided inside a housing including the card mounting surface 38 of the image reading apparatus 10. The transmission and reception antenna unit 18 includes a transmission coil 18a and a reception coil 18b.

The transmission coil 18a transmits an electromagnetic wave for power supply. In the first embodiment, the transmission coil 18a is inside of the housing of the image reading apparatus 10 and is mounted on the card mounting surface 38 on the carriage 40 side, for example. In the first embodiment, on the carriage 40 side of the card mounting surface 38, a wire, such as a copper wire, forming a coil is wound one or more times so as to surround the edge of the card mounting surface 38. With this, the transmission coil 18a is mounted on the card mounting surface 38. Thus, when the RFID card 32 is placed on the card mounting surface 38, the transmission coil 18a can surround the RFID card 32. The transmission coil 18a transmits an electromagnetic wave for power supply toward the card mounting surface 38. When the RFID card 32 is placed on the card mounting surface 38, the electromagnetic wave for power supply transmitted from the transmission coil 18a is received by the antenna coil 36 incorporated in the RFID card 32 and, with this received electromagnetic wave for power supply, the electronic tag 34 operates. The transmission coil 18a is driven by a transmission driving circuit 52. The transmission driving circuit 52 is connected to the second controlling unit 30 incorporated in the controlling apparatus 44. This transmission driving circuit 52 is controlled by the second controlling unit 30. Therefore, transmission of the electromagnetic wave for power supply by the transmission coil 18a is controlled by the second controlling unit 30.

The reception coil 18b receives an electromagnetic wave for transmission and reception of the ID information. By receiving this electromagnetic wave for transmission and reception of the ID information, the reception coil 18b receives a signal transmitted toward the reception coil 18b, that is, the ID information of the electronic tag 34 incorporated in the RFID card 32. In the first embodiment, the reception coil 18b is inside of the housing of the image reading apparatus 10 and is mounted on the card mounting surface 38 on the carriage 40 side, for example. In the first embodiment, on the carriage 40 side of the card mounting surface 38, a wire, such as a copper wire, forming a coil is wound one or more times so as to surround the edge of the card mounting surface 38. With this, the reception coil 18b is mounted on the card mounting surface 38 so as to be positioned outside of the transmission coil 18a. Thus, when the RFID card 32 is placed on the card mounting surface 38, the reception coil 18b can surround the RFID card 32. As explained above, the reception coil 18b is mounted on the carriage 40 side of the card mounting surface 38 so as to surround the edge of the card mounting surface 38 and, irrespectively of the positions of the electronic tag 34 on the card mounting surface 38 in the width direction and the orthogonal direction of the card mounting surface 38, transmits a signal based on the ID information stored in the electronic tag 34 from the antenna coil 36 of the RFID card 32. Therefore, the reception coil 18b can receive the signal transmitted from the electronic tag 34.

When the RFID card 32 is placed on the card mounting surface 38, the electronic tag 34 driven by the electromagnetic wave for power supply transmitted from the transmission coil 18a transmits a signal based on the ID information stored in the electronic tag 34 via the antenna coil 36 of the RFID card 32. Thus, the reception coil 18b can receive the signal transmitted from the electronic tag 34. The reception coil 18b is connected to a receiving circuit 54. The signal received by the reception coil 18b is subjected to filtering, amplification, and others at the receiving circuit 54. The receiving circuit 54 is connected to the ID-information obtaining unit 20 incorporated in the controlling apparatus 44. The signal received by the reception coil 18b and subjected to filtering, amplification, and others is input to the ID-information obtaining unit 20 of the controlling apparatus 44.

The ID-information obtaining unit 20 obtains the ID information of the electronic tag 34 of the RFID card 32 based on the electromagnetic wave for transmission and reception of the ID information received by the reception coil 18b. The ID-information obtaining unit 20 is connected to the transmission driving circuit 52 via the second controlling unit 30, outputting a transmission-coil driving control signal to the transmission driving circuit 52. The second controlling unit 30 drives the transmission driving circuit 52 based on the transmission-coil driving control signal output from the ID-information obtaining unit 20. Thus, the second controlling unit 30 drives the reception coil 18b. Also, the ID-information obtaining unit 20 is connected to the receiving circuit 54. To this ID-information obtaining unit 20, a signal received by the reception coil 18b and output from the receiving circuit 54 is input. The ID-information obtaining unit 20 receives an input of the signal received by the reception coil 18b. Based on the signal received by the reception coil 18b, the ID-information obtaining unit 20 obtains the ID information of the electronic tag 34. The ID information obtained by the ID-information obtaining unit 20 is stored in a second memory 56 by the second controlling unit 30. This second memory 56 includes a non-volatile memory, such as a flash memory, for example. The ID-information obtaining unit 20 as explained above obtains the ID information of the electronic tag 34 of the RFID card 32 when the reading unit 14 images the RFID card 32. In more detail, while the image pickup device 14a of the reading unit 14 is imaging the image read surface 32a of the RFID card 32, the transmission coil 18a of the transmission and reception antenna unit 18 transmits an electromagnetic wave for power supply. With this, the reception coil 18b of the transmission and reception antenna unit 18 receives the electromagnetic wave for transmission and reception of the ID information transmitted from the antenna coil 36 of the RFID card 32. Based on this electromagnetic wave for transmission and reception of the ID information received by the reception coil 18b, the ID-information obtaining unit 20 obtains the ID information of the electronic tag 34 of the RFID card 32.

The magnetic shielding member 22 suppresses interference of at least either one of the electromagnetic wave for power supply transmitted from the transmission coil 18a and the electromagnetic wave for transmission and reception of the ID information transmitted from the antenna coil 36 of the RFID card 32 with the reading unit 14, in other words, at least either one of the image pickup device 14a and the carrier cable 14b. As depicted in FIG. 2, in the first embodiment, the magnetic shielding member 22 blocks the electromagnetic wave for power supply transmitted from the transmission coil 18a and the electromagnetic wave for transmission and reception of the ID information transmitted from the antenna coil 36 of the RFID card 32, thereby suppressing interference of at least either one of the electromagnetic wave for power supply transmitted from the transmission coil 18a and the electromagnetic wave for transmission and reception of the ID information transmitted from the antenna coil 36 of the RFID card 32 with the carrier cable 14b. The magnetic shielding member 22 is provided to the carrier cable 14b. In more detail, the magnetic shielding member 22 may cover the entire carrier cable 14b, for example. The magnetic shielding member 22 as explained above is a soft magnetic material, for example.

The interfaces 24 exchange various instructions and data with external devices, that is, the personal computer 48 in the first embodiment. The interfaces 24 are used to output to the personal computer 48 at least either one of the pickup image data representing the image read surface 32a of the RFID card 32 and the ID information of the electronic tag 34. In the first embodiment, the interfaces 24 include the first interface unit 46 and a second interface unit 57.

The first interface unit 46 is connected to a scanner controlling unit 58 incorporated in the personal computer 48. This first interface unit 46 can input a scanner control signal output from the scanner controlling unit 58 to the first controlling unit 28. Also, the first interface unit 46 is connected to the image-data generating unit 16. The first interface unit 46 can output the image data generated by the image-data generating unit 16 to the scanner controlling unit 58 of the personal computer 48. The scanner controlling unit 58 is controlled by an overall controlling unit 60 incorporated in the personal computer 48.

The second interface unit 57 is connected to an RFID controlling unit 62 incorporated in the personal computer 48. This second interface unit 57 can input an RFID control signal output from the RFID controlling unit 62 to the second controlling unit 30. Since the second interface unit 57 is also connected to the ID-information obtaining unit 20 via the second controlling unit 30, the second interface unit 57 can output the ID information output from the ID-information obtaining unit 20 via the second controlling unit 30 to the RFID controlling unit 62 of the personal computer 48. The RFID controlling unit 62 is controlled by the overall controlling unit 60 incorporated in the personal computer 48.

The additional-information input unit 26 inputs additional information about the RFID card 32 to the image reading apparatus 10 through a manual operation. The additional-information input unit 26 is incorporated in the controlling apparatus 44. The additional-information input unit 26 has a user interface, such as a numerical keyboard or touch-type liquid-crystal panel. A user of the image reading apparatus 10 manually operates this user interface through pressing or the like, for example, thereby inputting additional information to the image reading apparatus 10. For example, when the RFID card 32 is an IC driver's license, this additional information is a secret identification number required for obtaining the ID information of the IC driver's license.

When at least either one of the pickup image data representing the image read surface 32 of the RFID card 32 and the ID information of the electronic tag 34 is output to the personal computer 48 via the first interface unit 46 and the second interface unit 57, the first controlling unit 28 and the second controlling unit 30 encrypt at least either one of the pickup image data and the ID information for output.

Specifically, when the pickup image data is output to the personal computer 48 via the first interface unit 46, the first controlling unit 28 encrypts this pickup image data for output. A setting as to whether to encrypt the pickup image data can be selected by, for example, the user of the image reading apparatus 10 operating the user interface not shown provided to the controlling apparatus 44. In the first embodiment, it is set that the pickup image data is encrypted by the first controlling unit 28.

On the other hand, when the ID information of the electronic tag 34 of the RFID card 32 is output to the personal computer 48 via the second interface unit 57, the second controlling unit 30 encrypts this ID information for output. A setting as to whether to encrypt the ID information can be selected by, for example, the user of the image reading apparatus 10 operating the user interface not shown provided to the controlling apparatus 44. In the first embodiment, it is set that the ID information is encrypted by the second controlling unit 30.

The carriage 40 moves with respect to the card mounting surface 38. The carriage 40 is disposed inside of the housing not shown of the image reading apparatus 10. This carriage moves in one direction of the card mounting surface 38, that is, a longitudinal direction of the card mounting surface 38 (the direction indicated by the arrow A in FIG. 1) in the first embodiment, so as to face the entire area of the card mounting surface 38. As such, the carriage 40 is supported by the housing of the image reading apparatus 10 so as to freely move. The carriage 40 is formed so that the length in the longitudinal direction is longer than the length of the card mounting surface 38 in a direction orthogonal to the direction in which the carriage 40 moves. That is, the width of the carriage is set wider than the width of the card mounting surface 38. Also, since the carriage 40 has the light source 12 and the image pickup device 14a incorporated therein, the carriage 40 can move the light source 12 and the image pickup device 14a, together with the carriage 40 itself, with respect to the card mounting surface 38, thereby causing the light source 12 and the image pickup device 14a to face the entire area of the card mounting surface 38.

The carriage 40 has a motor 64 connected thereto. With the rotation driving force of the motor 64, the carriage 40 moves in a longitudinal direction of the card mounting surface 38. This motor 64 is controlled by a motor driving circuit 66. The motor driving circuit 66 is controlled by the first controlling unit 28. Therefore, the motor 64 is controlled by the first controlling unit 28.

Next, the operation of the image reading apparatus 10 according to the first embodiment is explained.

When the controlling apparatus 44 of the image reading apparatus 10 receives from the scanner controlling unit 58 of the personal computer 48, for example, an instruction for starting imaging of the image read surface 32a of the RFID card 32 on the card mounting surface 38, the first controlling unit 28 of the controlling apparatus 44 drives the light source 12 and the image pickup device 14a. Also, the first controlling unit 28 controls the driving of the motor 64.

The first controlling unit 28 causes the light source 12 to be driven by the light-source driving circuit 42, thereby causing light to be emitted from the light source 12 toward the card mounting surface 38. Also, the first controlling unit 28 causes the image pickup device 14a to be driven at predetermined exposure intervals. Furthermore, the first controlling unit 28 outputs a motor driving control signal to the motor driving circuit 66 to drive the motor 64, thereby causing the carriage 40 to be moved in the direction indicated by the arrow A with respect to the card mounting surface 38. That is, the light source 12 emitting light to the card mounting surface 38 and the image pickup device 14a driven at the predetermined exposure intervals move together with the carriage 40 with respect to the card mounting surface 38. With this, the image pickup device 14a scans the entire area of the card mounting surface 38. Before the start of scanning the entire area of the card mounting surface 38 by the image pickup device 14a, the carriage 40 is positioned at either one of ends of the card mounting surface 38 in a longitudinal direction. Upon the start of scanning, the carriage 40 moves from the one end toward the other. At the end of scanning, the carriage 40 is positioned at the other end of the card mounting surface 38.

After the image read surface 32a of the RFID card 32 is imaged by the image pickup device 14a of the reading unit 14, a pickup image signal representing the image read surface 32a of the RFID card 32 is output from the image pickup device 14a. The pickup image signal representing the image read surface 32a of the RFID card 32 output from the image pickup device 14a is transmitted via the carrier cable 14b to the image-data generating unit 16 in the controlling apparatus 44. In the image-data generating unit 16, the pickup image signal is subjected to A/D (Analog-to-Digital) conversion and other processes and, eventually, pickup image data representing the image read surface 32a of the RFID card 32 is generated.

While the image pickup device 14a of the reading unit 14 is imaging the image read surface 32a of the RFID card 32, the ID-information obtaining unit 20 outputs a transmission-coil driving control signal to the transmission driving circuit 52 via the second controlling unit 30 to drive the transmission driving circuit 52 to cause the transmission coil 18a to transmit an electromagnetic wave for power supply. When the antenna coil 36 of the RFID card 32 placed on the card mounting surface 38 receives the electromagnetic wave for power supply, the ID information of the electronic tag 34 of the RFID card 32 is transmitted with an electromagnetic wave for transmission and reception of the ID information from the antenna coil 36. Then, when the reception coil 18b receives the electromagnetic wave for transmission and reception of the ID information transmitted from the antenna coil 36, the ID information of the electronic tag 34 of the RFID card 32 is input via the receiving circuit 54 to the ID-information obtaining unit 20. In this manner, the ID-information obtaining unit 20 obtains the ID information of the electronic tag 34 of the RFID card 32.

At this time, in the image reading apparatus 10, interference of the electromagnetic wave for power supply and the electromagnetic wave for transmission and reception of the ID information that would otherwise propagate to the carrier cable 14b of the reading unit 14 with the carrier cable 14b of the reading unit 14 is suppressed by the magnetic shielding member 22 as the interface suppressing unit. Therefore, even if the ID-information obtaining unit 20 obtains the ID information of the electronic tag 34 of the RFID card 32 while the image read surface 32a of the RFID card 32 is being imaged by the reading unit 14, an influence of the electromagnetic wave for power supply and the electromagnetic wave for transmission and reception of the ID information over the carrier cable 14b of the reading unit 14 can be suppressed. Therefore, even if the pickup image data of the image read surface 32a of the RFID card 32 and the ID information of the electronic tag 34 are simultaneously obtained, the obtained pickup image data representing the image read surface 32a of the RFID card 32 can be of high quality.

Also, in the image reading apparatus 10, an influence of the electromagnetic wave for power supply and the electromagnetic wave for transmission and reception of the ID information over the carrier cable 14b can be suppressed only by providing the magnetic shielding member 22 to the carrier cable 14b. Therefore, for example, an increase in apparatus cost can be suppressed.

Furthermore, in the image reading apparatus 10 of a flatbed type, the transmission coil 18a and the reception coil 18b forming the transmission and reception antenna unit 18 are provided inside of the housing including the card mounting surface 38. Therefore, for example, upsizing of the apparatus can be suppressed.

Still further, the image reading apparatus 10 can output at least either one of the pickup image data generated by the image-data generating unit 16 and the ID information obtained by the ID-information obtaining unit 20 (in the first embodiment, both of the pickup image data and the ID information) via the first interface unit 46 and the second interface unit 57 forming the interfaces 24 to external devices, such as the personal computer 48 in the first embodiment. Therefore, for example, the pickup image data and the ID information obtained by the image reading apparatus 10 can be processed by the personal computer 48 as an external device.

Still further, in the image reading apparatus 10, when at least either one of the pickup image data generated by the image-data generating unit 16 and the ID information obtained by the ID-information obtaining unit 20 (in the first embodiment, both of the pickup image data and the ID information) via the first interface unit 46 and the second interface unit 57 forming the interfaces 24 to the personal computer 48 as an external device, the output pickup image data is encrypted by the first controlling unit 28 as an encrypting unit and the ID information is encrypted by the second controlling unit 30 as an encrypting unit. Therefore, should the pickup image data and the ID information leak away from the image reading apparatus 10, the contents of the pickup image data and the ID information can be prevented from being known to third parties.

Still further, in the image reading apparatus 10, the user interface of the additional-information input unit 26 is manually operated, thereby inputting to the apparatus additional information about the RFID card 32, that is, a password for obtaining the ID information of the electronic tag 34 of an IC driver's license in the first embodiment. Thus, when the RFID card 32 is an IC driver's license, for example, the secret identification number for obtaining the ID information of the electronic tag 34 can be input only with the image reading apparatus 10.

In the first embodiment, explanation is made by assuming that the image reading apparatus 10 has the magnetic shielding member 22 provided to the carrier cable 14b of the reading unit 14. However, the present invention is not meant to be restricted to this. Alternatively, in the present invention, a magnetic shielding material may be provided to the carrier cable 14b, for example. In more detail, the magnetic shielding material may be applied to the entire carrier cable 14b, for example. The magnetic shielding material as explained above is a soft magnetic material, for example. Even when the magnetic shielding material is provided to the carrier cable 14b, as with the case explained above, an influence of the electromagnetic wave for power supply and the electromagnetic wave for transmission and reception of the ID information over the carrier cable 14b can be suppressed. Also, an increase in apparatus cost can be suppressed, for example.

Figure 3:
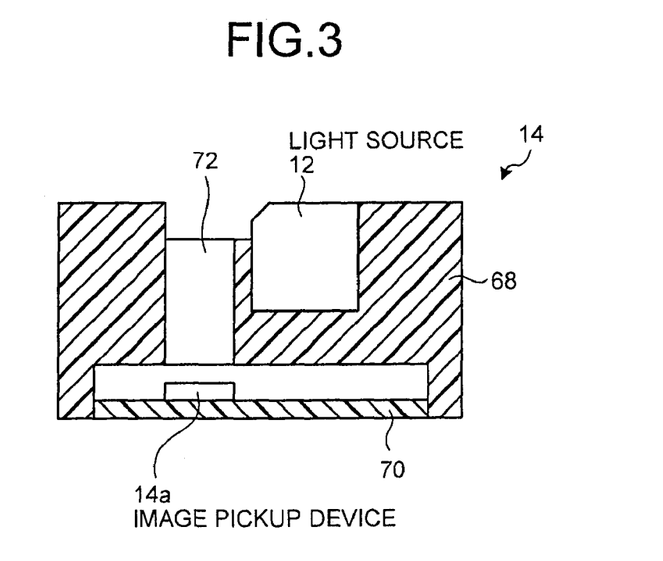
FIG. 3 is a cross-section view of a main portion of an image reading apparatus according to a second embodiment of the present invention.

An image reading apparatus according to a second embodiment of the present invention is explained below. FIG. 3 is a cross-section views each depicting a main portion of an image reading apparatus according to the second embodiment. Note that components similar to those in the first embodiment are provided with the same reference numerals and a redundant explanation will be omitted.

An interference suppressing unit according to the second embodiment is a magnetic shielding material provided to a casing 68 of the image pickup device 14a. The casing 68 is formed in an approximately rectangular parallelepiped shape. On the bottom of the casing 68, a concave portion is formed, where the image pickup device 14a is disposed as being implemented on a substrate 70 so as to be fixed to the casing 68. The casing 68 is made of resin mixed with plastic, glass, and the magnetic shielding material. In the second embodiment, the magnetic shielding material provided to the casing 68 blocks the electromagnetic wave for power supply transmitted from the transmission coil 18a and the electromagnetic wave for transmission and reception of the ID information transmitted from the antenna coil 36 of the RFID card 32. This suppresses interference of at least either one of the electromagnetic wave for power supply transmitted from the transmission coil 18a and the electromagnetic wave for transmission and reception of the ID information transmitted from the antenna coil 36 of the RFID card 32 with the image pickup device 14a. This magnetic shielding member is a soft magnetic material, for example.

A member denoted by a reference numeral 72 in FIG. 3 is a lens that guides the light reflected from the image read surface 32a of the RFID card 32 toward the image pickup device 14a.

In the image reading apparatus 10 according to the second embodiment, the magnetic shielding material contained in the casing 68 as an interference suppressing unit suppresses interference of the electromagnetic wave for power supply and the electromagnetic wave for transmission and reception of the ID information that would otherwise propagate to the image pickup device 14a of the reading unit 14 with the image pickup device 14a of the reading unit 14. Therefore, even if the ID-information obtaining unit 20 obtains the ID information of the electronic tag 34 of the RFID card 32 while the image read surface 32a of the RFID card 32 is being imaged by the reading unit 14, an influence of the electromagnetic wave for power supply and the electromagnetic wave for transmission and reception of the ID information over the image pickup device 14a of the reading unit 14 can be suppressed. Thus, even if the pickup image data representing the image read surface 32a of the RFID card 32 and the ID information of the electronic tag 34 are simultaneously obtained, the obtained pickup image data representing the image read surface 32a of the RFID card 32 can be of high quality.

Furthermore, in the image reading apparatus 10 according to the second embodiment, an influence of the electromagnetic wave for power supply and the electromagnetic wave for transmission and reception of the ID information over the image pickup device 14a can be suppressed only by providing a magnetic shielding material to the casing 68 of the image pickup device 14a. Therefore, for example, an increase in apparatus cost can be suppressed.

In the second embodiment, explanation is made by assuming that the image reading apparatus 10 has the magnetic shielding material provided to the casing 68 of the image pickup device 14a. However, the present invention is not meant to be restricted to this. Alternatively, in the present invention, a magnetic shielding member may be mounted on the image pickup device 14a, for example. This magnetic shielding member is a soft magnetic material, for example. Even when the magnetic shielding member is mounted on the image pickup device 14a, as with the case explained above, an influence of the electromagnetic wave for power supply and the electromagnetic wave for transmission and reception of the ID information over the image pickup device 14a can be suppressed. Also, an increase in apparatus cost can be suppressed, for example.

Figure 4A:
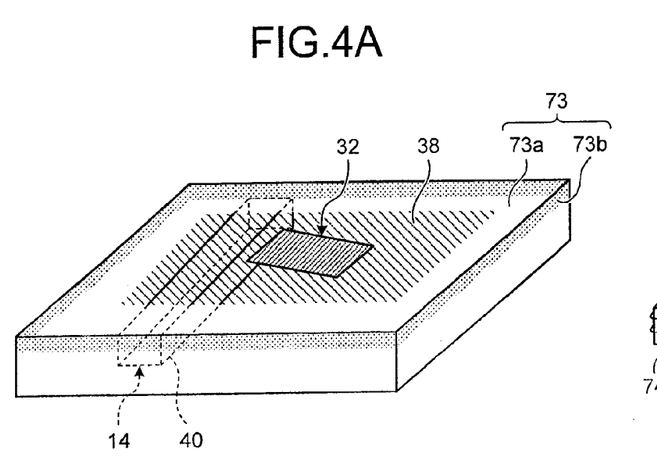
FIGS. 4A and 4B are perspective views each depicting a main portion of an image reading apparatus according to a third embodiment of the present invention.
Figure 4B:
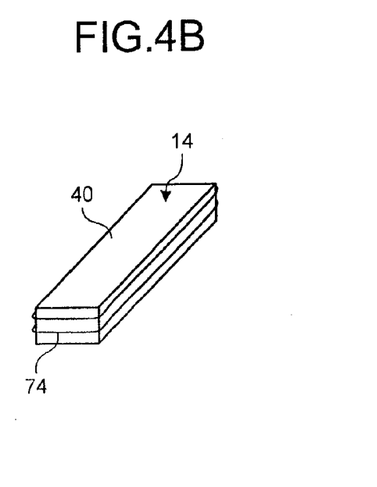

An image reading apparatus according to a third embodiment of the present invention is explained below. FIGS. 4A and 4B are perspective views each depicting a main portion of the image reading apparatus according to the third embodiment. Note that components similar to those in the first and second embodiments are provided with the same reference numerals and a redundant explanation will be omitted.

As depicted in FIG. 4A, a transmitting and receiving unit according to the third embodiment is a transmission and reception antenna unit 73. This transmission and reception antenna unit 73 is functionally identical to the transmission and reception antenna unit 18 explained in the first embodiment. The transmission and reception antenna unit 73 includes a transmission coil 73a and a reception coil 73b.

The transmission coil 73a is functionally identical to the transmission coil 18a explained in the first embodiment. The transmission coil 73a is provided inside of the housing including the card mounting surface 38 of the image reading apparatus 10. In more detail, the transmission coil 73a is disposed over an entire top plate on the carriage 40 side with respect to the card mounting surface 38.

The reception coil 73b is functionally identical to the reception coil 18b explained in the first embodiment. The reception coil 73b is disposed in a circular shape along the edge of the top plate of the image reading apparatus 10.

Figure 5:
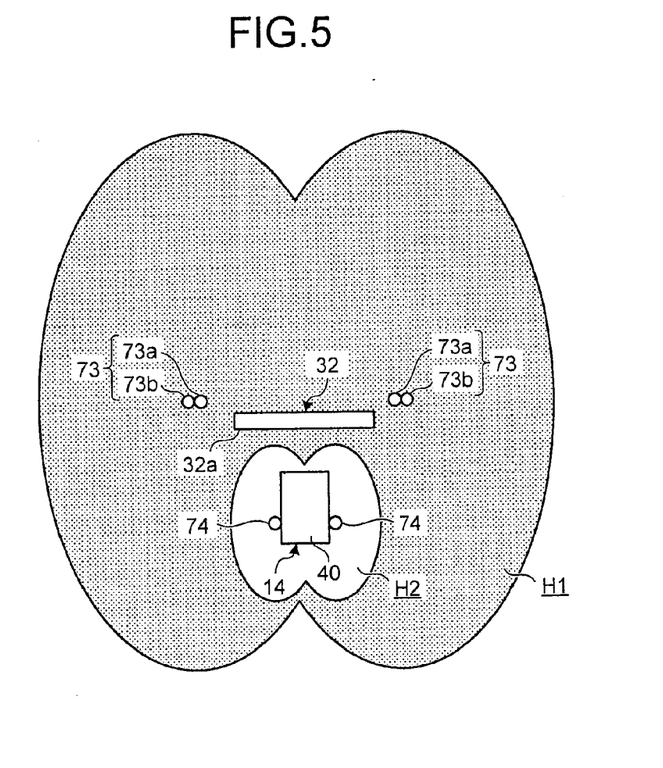
FIG. 5 is a schematic drawing of a relation between a propagation area and a suppression area.

As depicted in FIG. 5, with the transmission and reception antenna unit 73 and the antenna coil 36 of the RFID card 32, a propagation area H1 is formed where at least either one of the electromagnetic wave for power supply transmitted from the transmission coil 73a and the electromagnetic wave for transmission and reception of the ID information transmitted from the antenna coil 36 of the RFID card 32 propagate. This propagation area H1 includes a movement path of the carriage 40. Therefore, at least either one of the electromagnetic wave for power supply and the electromagnetic wave for transmission and reception of the ID information has an influence over at least the image pickup device 14a incorporated in the carriage 40. To suppress an influence of at least either one of the electromagnetic wave for power supply and the electromagnetic wave for transmission and reception of the ID information over at least the image pickup device 14a of the reading unit 14 positioned in the propagation area H1, a closed-loop coil 74 as the interface suppressing unit are disposed around the carriage 40.

As depicted in FIG. 4B, the closed-loop coil 74, which is an interference suppressing unit according to the third embodiment, is formed by an electrical wire, such as a copper wire forming a coil, being wound one or more times in approximately parallel to the card mounting surface 38. In the third embodiment, this wire is wound one or more times around the carriage 40 in approximately parallel to the card mounting surface 38, and the ends of the wire are eventually connected to each other.

As depicted in FIG. 5, the closed-loop coil 74 forms a suppression area H2 disposed in the propagation area H1 where at least either one of the electromagnetic wave for power supply and the electromagnetic wave for transmission and reception of the ID information propagates and a magnetic flux change is suppressed based on the magnetic-flux change in the propagation area H1. In more detail, when the state between the transmission and reception antenna unit 73 and the antenna coil 36 of the RFID card 32 is changed from a state where the electromagnetic wave for power supply and the electromagnetic wave for transmission and reception of the ID information are not transmitted and received to a state where these electromagnetic waves are transmitted and received, a magnetic flux of at least either one of the electromagnetic wave for power supply and the electromagnetic wave for transmission and reception of the ID information passes through a closed loop formed by the closed-loop coil 74. Therefore, the magnetic flux in the closed-loop coil 74 is changed. With this magnetic-flux change in the closed-loop coil 74, in the closed-loop coil 74, an induced electromotive force is generated by electromagnetic induction, which causes a magnetic flux for suppressing a change. An area formed by a collection of magnetic fluxes for suppressing a change is the suppression area H2. Since this suppression area H2 is formed based on electromagnetic induction explained above, the suppression area H2 is formed only near the closed-loop coil 74. While the suppression area H2 is being formed, the magnetic flux in the suppression area H2 is varied so as to eliminate a magnetic-flux change of the electromagnetic wave for power supply and the electromagnetic wave for transmission and reception of the ID information. In this suppression area H2, at least either one of the image pickup device 14a and the carrier cable 14b is disposed. In the third embodiment, at least the image pickup device 14a of the reading unit 14 is disposed.

As in the third embodiment, when the closed-loop coil 74 is located on the same side as that of the transmission and reception antenna unit 73 with respect to the RFID card 32 placed on the card mounting surface 38 or when the closed-loop coil 74 and the transmission and reception antenna unit 73 are on the same plane, the closed-loop coil 74 can be formed so that, for example, the dimension of the closed-loop coil 74 in a short-side direction is smaller than the dimension of the antenna coil 36 of the RFID card 32 in a short-side direction, in order not to decrease power-supply capability from the transmission and reception antenna unit 73 to the RFID card 32. Also, as depicted in FIG. 5, when the closed-loop coil 74 is located on an opposite side of the transmission and reception antenna unit 73 with respect to the RFID card 32 placed on the card mounting surface 38, in order not to decrease power-supply capability from the transmission and reception antenna unit 73 to the RFID card 32 by the suppression area H2, the closed-loop coil 74 can be disposed to be separated from the card mounting surface 38 so that, for example, the suppression area H2 does not include the antenna coil 36 of the RFID card 32. Alternatively, it is possible for the suppression area H2 not to include the antenna coil 36 of the RFID card 32 by changing the number of winding of the coil forming the closed-loop coil 74. In this manner, the closed-loop coil 74 does not partition the propagation area H1 with the suppression area H2 between the transmission and reception antenna unit 73 as the transmitting and receiving unit and the antenna coil 36 as the ID-information transmitting unit.

In the image reading apparatus 10 according to the third embodiment, when the electromagnetic wave for power supply and the electromagnetic wave for transmission and reception of the ID information are transmitted and received between the transmission and reception antenna unit 73 and the antenna coil 36 of the RFID card 32, the magnetic flux of the electromagnetic wave for power supply and the electromagnetic wave for transmission and reception of the ID information passes through the closed-loop coil 74, and the magnetic flux in the closed-loop coil 74 is changed. The closed-loop coil 74 generates an induced electromotive force by electromagnetic induction. In the closed-loop coil 74, this induced electromotive force causes a magnetic flux for suppressing a change, forming the suppression area H2 inside of the propagation area H1 where the electromagnetic wave for power supply and the electromagnetic wave for transmission and reception of the ID information propagate. As a result, inside of the suppression area H2, the magnetic flux is fluctuated so as to eliminate a magnetic-flux change of the electromagnetic wave for power supply and the electromagnetic wave for transmission and reception of the ID information. In this manner, interference of the electromagnetic wave for power supply and the electromagnetic wave for transmission and reception of the ID information that would otherwise propagate to at least the image pickup device 14a of the reading unit 14 with at least the image pickup device 14a of the reading unit 14 is suppressed by the closed-loop coil 74 as the interference suppressing unit. Thus, even if the ID-information obtaining unit 20 obtains the ID information of the electronic tag 34 of the RFID card 32 while the image read surface 32a of the RFID card 32 is being imaged by the reading unit 14, an influence of the electromagnetic wave for power supply and the electromagnetic wave for transmission and reception of the ID information over at least the image pickup device 14a of the reading unit 14 can be suppressed. Therefore, even if pickup image data representing the image read surface 32a of the RFID card 32 and the ID information of the electronic tag 34 are simultaneously obtained, the obtained pickup image data representing the image read surface 32a of the RFID card 32 can be of high quality.

Also, in the image reading apparatus 10 according to the third embodiment, when the magnetic flux in the propagation area H1 where the electromagnetic wave for power supply and the electromagnetic wave for transmission and reception of the ID information propagate is changed, in the suppression area H2 where at least either one of the image pickup device 14a and the carrier cable 14b (in FIGS. 4A, 4B, and 5, at least the image pickup device 14a of the reading unit 14) is disposed, an induced electromotive force occurring in the closed-loop coil 74 causes a magnetic flux for suppressing a change, thereby suppressing a magnetic-flux change in the propagation area H1. Therefore, it is possible for the closed-loop coil 74 to suppress an influence of the magnetic-flux change in the propagation area H1 over the image pickup device 14a, the carrier cable 14b, or both disposed in the suppression area H2 (in FIGS. 4A, 4B, and 5, the image pickup device 14a). Thus, for example, even if the closed-loop coil 74 is not provided so as to cover the image pickup device 14a, the carrier cable 14b, or both (in FIGS. 4A, 4B, and 5, at least the image pickup device 14a of the reading unit 14), it is possible to suppress an influence of the electromagnetic wave for power supply and the electromagnetic wave for transmission and reception of the ID information over the image pickup device 14a, the carrier cable 14b, or both disposed in the suppression area H2 (in FIGS. 4A, 4B, and 5, at least the image pickup device 14a of the reading unit 14).

Furthermore, in the image reading apparatus 10 according to the third embodiment, the propagation area H1 where at least either one of the electromagnetic wave for power supply and the electromagnetic wave for transmission and reception of the ID information is propagated is not partitioned with the suppression area H2 formed of the closed-loop coil 74 between the transmission and reception antenna unit 73 as the transmitting and receiving unit and the antenna coil 36 of the RFID card 32 as the ID-information transmitting unit. Therefore, between the transmission and reception antenna unit 73 formed of the transmission coil 73a and the reception coil 73b and the antenna coil 36 of the RFID card 32, transmission and reception of the electromagnetic wave for power supply and the electromagnetic wave for transmission and reception of the ID information are not interfered with. With this, the ID information of the electronic tag 34 can be obtained without decreasing power supply to the RFID card 32.

In the first to third embodiments, the transmission and reception antenna unit 18, 73 is provided inside of the housing including the card mounting surface 38. However, the present invention is not meant to be restricted to this. For example, in the present invention, in the image reading apparatus 10 of a flatbed type, the transmission and reception antenna unit 18, 73 may be provided to the lid member 39 that covers the card mounting surface 38. Even when the transmission and reception antenna unit 18, 73 is provided to the lid member 39, upsizing of the image reading apparatus 10 can be suppressed, for example.

Also, for example, by combining the first and second embodiments or the first and third embodiments, an influence of at least either one of the electromagnetic wave for power supply and the electromagnetic wave for transmission and reception of the ID information over both of the image pickup device 14a of the reading unit 14 and the carrier cable 14b can be suppressed.

Furthermore, in the first to third embodiments, the controlling apparatus 44 of the image reading apparatus 10 has a configuration such that the first controlling unit 28 as a controlling unit for pickup image data and the second controlling unit 30 as a controlling unit for ID information are separately provided. However, the present invention is not meant to be restricted to this. In the present invention, as long as an imaging system including the image pickup device 14a of the reading unit 14 and an electromagnetic-wave transmission and reception system including the transmission coil 18a and the reception coil 18b of the transmission and reception antenna unit 18 (in the third embodiment, the transmission coil 73a and the reception coil 73b of the transmission and reception antenna unit 73) are controlled independently, a single controlling unit may be provided to the controlling apparatus 44, instead of providing the first controlling unit 28 and the second controlling unit 30 to the controlling apparatus 44, and this single controlling unit may serve as both of the first controlling unit 28 and the second controlling unit 30.

Still further, in the first to third embodiments, the controlling apparatus 44 of the image reading apparatus 10 has a configuration such that the first interface unit 46 as an interface for pickup image data and the second interface unit 57 as an interface for ID information are separately provided. However, the present invention is not meant to be restricted to this. In the present invention, a single interface that can support both of transmission and reception of the pickup image data and the ID information with external devices may be provided to the controlling apparatus 44, instead of providing the first interface unit 46 and the second interface unit 57 to the controlling apparatus 44.

In the first to third embodiments, explanation is made by assuming that the image reading apparatus 10 is of an image reading apparatus of a flatbed type. However, the present invention is not meant to be restricted to this. The present invention can achieve effects similar to those in the first to third embodiments even with an image reading apparatus of an automatic document feeder (ADF) type. In more detail, in general, power supply to the RFID card 32 is a total of magnetic fluxes passing through the antenna coil 36 of the RFID card 32. Therefore, when the transmission coil and the reception coil of the transmission and reception antenna unit is smaller than a closed-loop area formed by the antenna coil 36 of the RFID card 32, in other words, when the closed-loop area formed by the transmission coil and the reception coil is small, transmission efficiency of the electromagnetic wave for power supply is significantly decreased, and the amount of magnetic fluxes passing through the antenna coil 36 of the RFID card 32 is not enough to activate the electronic tag 34 of the RFID card 32. Therefore, communications cannot be made between the transmission and reception antenna unit of the image reading apparatus and the antenna coil 36 of the RFID card 32. To allow communications between the transmission and reception antenna unit of the ADF-type image reading apparatus and the antenna coil 36 of the RFID card 32, the dimension (for example, the width) of the closed loop formed of the transmission coil and the reception coil of the transmission and reception antenna unit of the ADF-type image reading apparatus is required to be made equivalent to the size (for example, the width) of the RFID card 32, thereby achieving the amount of magnetic fluxes passing through the antenna coil 36 of the RFID card 32 enough to activate the electronic tag 34 of the RFID card 32. For this reason, in a small ADF-type image reading apparatus, the reading unit and the transmission and reception antenna unit are made adjacent to each other along a direction in which the RFID card 32 is conveyed, or the reading unit and the transmission and reception antenna unit are disposed so as to be superposed in position each other. As a result, while the image pickup device of the reading unit of this ADF-type image reading apparatus is imaging the image read surface 32a of the RFID card 32, when the ID-information obtaining unit outputs a transmission-coil driving control signal via the second controlling unit to the transmission driving circuit to drive the transmission driving circuit and cause the transmission coil to transmit an electromagnetic wave for power supply, the electromagnetic wave for power supply and the electromagnetic wave for transmission and reception of the ID information disadvantageously have an influence over the reading unit. However, as with the first to third embodiments explained above, by providing the interference suppressing unit to this ADF-type image reading apparatus, an influence of the electromagnetic wave for power supply and the electromagnetic wave for transmission and reception of the ID information over the reading unit can be suppressed.

In the embodiments of the present invention, the interference suppressing unit suppresses interference of the electromagnetic wave for power supply and the electromagnetic wave for transmission and reception of the ID information that would propagate to a reading unit with, for example, the image pickup device, the carrier cable, and others. Thus, even if the ID-information obtaining unit obtains ID information of the tag of the RFID card while the image read surface of the RFID card is being imaged by the reading unit, an influence of the electromagnetic wave for power supply, the electromagnetic wave for transmission and reception of the ID information, or both over the reading unit can be suppressed. With this, an effect can be achieved such that, even if pickup image data representing the image read surface of the RFID card and the ID information of the electronic tag are simultaneously obtained, the obtained pickup image data representing the image read surface of the RFID card can be of high quality.

Also, in the embodiments of the present invention, an influence of the electromagnetic wave for power supply, the electromagnetic wave for transmission and reception of the ID information, or both over the carrier cable can be suppressed only by providing a magnetic shielding member or a magnetic shielding material to the carrier cable. With this, for example, an effect of suppressing an increase in apparatus cost can be achieved.

Furthermore, in the embodiments of the present invention, an influence of the electromagnetic wave for power supply, the electromagnetic wave for transmission and reception of the ID information, or both over the image pickup device can be suppressed only by mounting a magnetic shielding member on the image pickup device or providing a magnetic shielding material to the casing of the image pickup device. With this, for example, an effect of suppressing an increase in apparatus cost can be achieved.

Still further, in the embodiments of the present invention, when the magnetic flux in the propagation area where the electromagnetic wave for power supply or the electromagnetic wave for transmission and reception of the ID information is changed, in the suppression area where at least either one of the image pickup device and the carrier cable is disposed, a magnetic flux for suppressing a change is caused by an induced electromotive force occurring at the closed-loop coil, thereby suppressing the magnetic-flux change in the propagation area. Thus, an influence of the magnetic-flux change in the propagation area by the closed-loop coil over the image pickup device, the carrier cable, or both disposed in the suppression area can be suppressed. With this, for example, an effect can be achieved such that, even if no closed-loop coil to cover the image pickup device, the carrier cable, or both is provided, an influence of the electromagnetic wave for power supply, the electromagnetic wave for transmission and reception of the ID information, or both over the image pickup device and the carrier cable disposed in the suppression area can be suppressed.

Still further, in the embodiments of the present invention, the propagation area where at least either one of the electromagnetic wave for power supply and the electromagnetic wave for transmission and reception of the ID information is propagated is not partitioned with the suppression area formed of a closed-loop coil between the transmitting and receiving unit and the ID-information transmitting unit. Therefore, between the transmitting and receiving unit and the ID-information transmitting unit, transmission and reception of the electromagnetic wave for power supply and the electromagnetic wave for transmission and reception of the ID information are not interfered with. With this, an effect can be achieved such that the ID information of the tag can be obtained without decreasing power supply to the RFID card.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
   a light source that emits light toward a card mounting surface where a radio-frequency identification (RFID) card is placed, the RFID card having incorporated therein a tag having identification (ID) information stored therein and an ID-information transmitting unit that receives an electromagnetic wave for power supply and transmits the ID information with an electromagnetic wave for transmission and reception of the ID information;
   a reading unit that includes an image pickup device, a casing that houses the image pickup device, and a light guide that guides light reflected by the RFID card to the image pickup device, wherein the reading unit images, based on the light from the light source, an image read surface of the RFID card on a card mounting surface side when the RFID card is placed on the card mounting surface and outputs a pickup image signal representing the image read surface of the RFID card;
   an image-data generating unit that generates pickup image data of the image read surface of the RFID card based on the output pickup image signal;
   a transmitting and receiving unit that transmits the electromagnetic wave for power supply and receives the electromagnetic wave for transmission and reception of the ID information;
   an ID-information obtaining unit that obtains the ID information based on the received electromagnetic wave for transmission and reception of the ID information, when the RFID card is imaged by the reading unit; and
   an interference suppressing unit that suppresses interference of at least either one of the electromagnetic wave for power supply and the electromagnetic wave for transmission and reception of the ID information with the reading unit, wherein
   the image pickup device images the image read surface of the RFID card based on the light from the light source and outputs the pickup image signal representing the image read surface of the RFID card,
   the reading unit includes a carrier cable that transmits the pickup image signal to the image-data generating unit,
   the interference suppressing unit suppresses the interference of at least either one of the electromagnetic wave for power supply and the electromagnetic wave for transmission and reception of the ID information with at least one of the image pickup device and the carrier cable, and includes a closed-loop coil that forms a suppression area, the suppression area is disposed in a propagation area where at least either one of the electromagnetic wave for power supply and the electromagnetic wave for transmission and reception of the ID information is propagated, and a magnetic-flux change in the suppression area is suppressed based on a magnetic-flux change in the propagation area, and at least either one of the image pickup device and the carrier cable is disposed in the suppression area.

2. The image reading apparatus according to claim 1, wherein the propagation area includes a region between the transmitting and receiving unit and the ID-information transmitting unit, and the interference suppressing unit is disposed such that the suppression area does not partition the region of the propagation area.

* * * * *